Patented Jan. 30, 1951

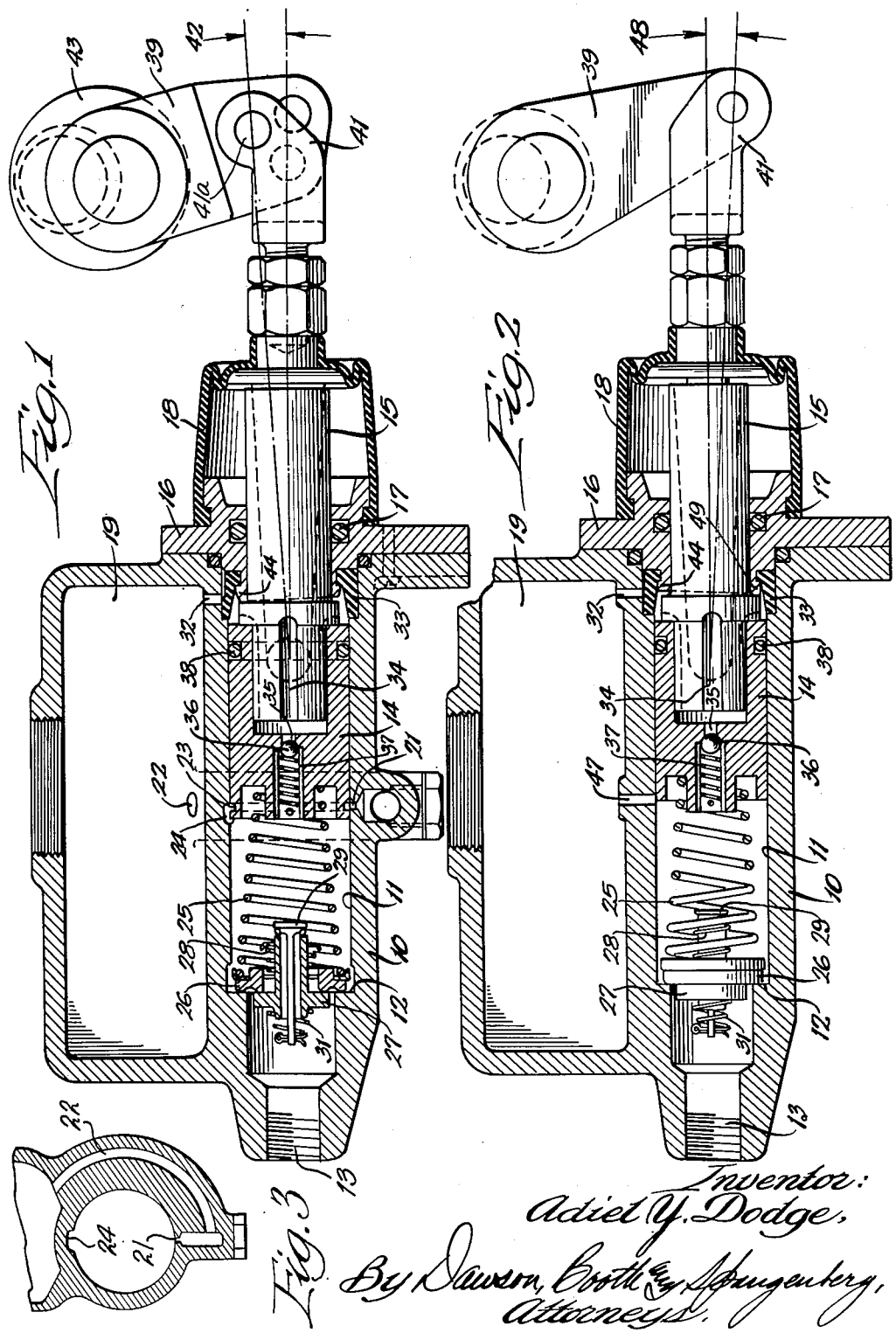

2,539,572

UNITED STATES PATENT OFFICE 2,539,572

MASTER CYLINDER FOR HYDRAULIC BRAKE SYSTEMS

Adiel Y. Dodge, Rockford, Ill.

Application October 25, 1946, Serial No. 705,769

15 Claims. (Cl. 60—54.6)

This invention relates to hydraulic pressure producing devices and more particularly to master cylinders for hydraulic braking systems.

One of the primary objects of this invention is to provide a more positive means to quickly supply liquid to the outlet side of a pressure producing device. In a braking system this enables the operator quickly to restore brake pedal reserve, when brake pedal reserve movement is needed.

Another object is to provide a hydraulic pressure producing device which produces a positive pumping action to force liquid from a secondary chamber at the actuating or piston rod side of its piston to a primary chamber at the discharge or brake line end of the piston during piston return. In a braking system, this permits liquid in the brake lines to be replenished at any point in the operating cycle by a small quick return movement of the brake pedal.

Another object is to provide a hydraulic pressure producing device in which a compensating port in the cylinder is tightly closed by the piston without requiring a yielding packing to cross the port. In the preferred construction, the operating forces acting on the piston both during pressure producing movement and when retracted are in such a direction as to produce a lateral component urging the piston against the port.

Still another object is to provide a hydraulic pressure producing device in which minimum residual pressure is maintained in the outlet lines. In a braking system this enables a very light return spring to be used on the brakes thereby reducing the initial pedal pressure required for brake application.

The above and other objects and advantages of the invention will be more readily apparent from the following description when read in connection with the accompanying drawing, in which:

Figure 1 is a sectional view of a master cylinder embodying the invention;

Figure 2 is a similar view of an alternative construction; and

Figure 3 is a transverse section through the passage 22.

As shown in Figure 1, the master cylinder comprises a body 10 which may be a casting and which is formed with an elongated cylindrical bore 11. At its discharge end, the body is reduced to provide a shoulder 12 and is formed with an outlet opening 13 for connection to a brake line. An elongated metal piston 14 is slidable in the cylinder 11 and is adapted to be moved by a piston rod 15 whose area is preferably about half the area of the cylinder. The piston rod extends through a closure plate 16 secured to the actuating or piston rod cylinder and which carries a yielding packing shown as an O-ring 17 fitting into a groove in the closure plate and engaging the piston rod. A flexible dust cover 18 may be secured to the closure plate and the piston rod to keep dirt out of the packing.

A liquid reservoir 19 is provided adjacent the cylinder and may be formed in an integral casting with the body 10. The reservoir is adapted to contain a body of liquid such as oil or the other fluids commonly used in hydraulic braking systems to maintain the cylinder and brake lines full of liquid. Communication between the cylinder and the reservoir is provided through a compensating port 21 opening into the side of the cylinder at the bottom thereof substantially mid-way of the length of the cylinder. A passage 22 formed in the casting connects the port 21 to the reservoir. The port 21 is adapted to be covered by the piston at all times except when the piston is in its fully retracted position, as shown in Figure 1. At this time, the port 21 registers with an annular groove 23 in the discharge or pressure end of the piston which in turn registers with a relatively small notch or groove 24 in the upper part of the cylinder wall. As shown, the notch or groove 24 extends from the groove 23 across the forward end of the piston to establish communication between the groove 23 and the primary chamber at the discharge end of the piston.

The piston is urged to its retracted position by a compression spring 25 acting between the discharge end of the piston and an annular valve disc 26 which seats against the shoulder 12. The disc 26 carries an annular check valve 27 which seats against the discharge side of the disc and which is urged to its seated position by a relatively light spring 28. To reduce residual pressure in the brake lines, a return check valve 29 is carried by the valve 27 and is urged to closed position by a light spring 31 so that the valve 29 will open in response to a relatively small pressure differential between the outlet lines and the primary chamber.

To maintain the outlet lines and the primary chamber full of liquid at all times so as to prevent sucking of air into the lines through the brake cylinders and to permit replenishment of the liquid at all times, the secondary chamber at the piston rod end of the piston is maintained full of liquid. For this purpose, a passage 32 is provided connecting the reservoir to the piston rod end of the cylinder. The passage is controlled by a check valve to permit building up of positive pumping pressure in the secondary chamber, the check valve as shown, being formed by a cup-shaped resilient packing 33 which normally seats over the lower end of the passage 32 and which will yield to permit liquid to flow from the reservoir into the secondary chamber. Fluid can flow from the secondary chamber into the primary chamber during return stroke of the piston through grooves 34 formed in the piston rod and through a passage 35 through the piston itself. The passage 35 is closed by a check valve 36 to prevent flow of liquid from the primary to the secondary chamber. As shown, the check valve is of the ball type operating in a bore which is only slightly reduced at its inner end to form a seat for the ball. With this construction, the effective areas exposed to pressure on opposite sides of the ball are substantially equal so that the ball will unseat in response to a relatively small pressure differential. The bore is formed with a plurality of grooves 37 toward the primary chamber side of the valve so that a large flow area past the valve is provided without requiring a large unseating movement of the valve.

According to one of the features of the present invention, the compensating port 21 is controlled solely by the metallic piston without requiring any yielding packing to cross the port. It has been found that when yielding packings are required to cross ports, particularly under conditions of relatively high pressures, the packings may be forced into the ports thereby damaging the packings and clogging the ports. As shown, the piston is sealed against the cylinder by an O-ring packing 38 carried in a groove in the piston sufficiently far from its discharge end so that the packing will never cross the compensating port. Because of the fact that the compensating port is at the bottom of the cylinder, gravity acting upon the piston tends to hold it against the port to assist in sealing the port. Due to the provision of the groove 23 and notch 24, any air bubbles accumulating in the cylinder will be collected at the top of the cylinder and forced through the groove 23 and passage 22 during return of liquid from the cylinder to the reservoir.

In addition to the effect of gravity, the piston is urged downward toward the compensating port by the applying means which acts upon the piston rod to move the piston forward. As shown, the piston rod is connected to an applying lever 39 which may be connected to the piston rod at any one of several points on the lever through a clevis 41 on the piston rod connected to the lever through a pin 41a. As shown the lever is formed with a plurality of spaced openings any one of which may receive the pin 41a to change the effective length of the lever. The point of pivotal connection between the piston rod and the applying lever is always maintained above the axis of the cylinder so that the applying force will be exerted on the piston through an angle, shown at 42. To maintain this relationship, regardless of the point of connection between the piston rod and the applying lever, the lever is preferably supported on an adjustable eccentric pivot 43. By turning this eccentric the lever 39 can be shifted to maintain its point of connection with the piston the desired distance above the piston axis to produce the angle 42.

Further, to insure tight engagement of the piston with the compensating port, the closure plate 16 is provided with a stop shoulder 44 which lies at an angle so that it will engage only the upper part of the piston or of a suitable shoulder on the piston rod. With this construction, when the piston is in its retracted position, as illustrated, the spring 25 acts on the piston at a point below its effective engagement with the stop shoulder 44 to produce a downward component on the piston. Thus the piston is urged downwardly at all times by gravity and by the downward component of the applying force acting through the angle 42 or by the component produced by the spring and the eccentric stop shoulder 44 so that the piston will be held tightly against the port. It is thus possible to control the compensating port with a metallic piston without requiring extremely close manufacturing tolerances and without causing a yielding packing to cross the port.

In operation, the parts will occupy the position shown in Figure 1 with the piston retracted when the brakes are released. To apply the brakes, the piston is moved to the left first to cut off the compensating port and thereafter to force the liquid in the primary chamber past the check valve 27 into the brake lines. During this movement, liquid will flow from the reservoir through the port 32 and past the check valve 33 into the secondary chamber behind the piston. Upon release of the brake pedal either temporarily to replenish the liquid in the brake line or to release the brake, the piston will be returned to the right by the spring 25. At this time, pressure in the brake cylinders will cause liquid to flow into the primary chamber past the check valve 29 and additionally past the disc 26 if the brake is released rapidly enough to produce a pressure differential sufficient to unseat the disc 26. At the same time, liquid trapped in the secondary chamber by closing of the valve 33 will be forced past the check valve 36 into the primary chamber. Preferably, the relationship of the areas of the piston and piston rod is such that the liquid pumped from the secondary chamber into the primary chamber will satisfy only about half and in no event more than seventy-five per cent of the increasing volume of the primary chamber. If the return stroke is stopped after a short movement and the piston is again pressed to the left, the additional liquid in the primary chamber and brake lines supplied from the secondary chamber will replenish the lines so that the brakes can be applied with maximum force with the pedal relatively near the top of its movement. If the piston is allowed to return to its fully retracted position, the excess liquid in the primary chamber and brake lines will flow through the notch 24, groove 23, and passage 22 back to the reservoir. Because my pumping action prevents air from being drawn into the system through the wheel cylinders, a very small residual pressure may be employed in the brake lines and is maintained by the check valve 29 thereby contributing to ease of operation of the brake pedal during initial application. Thus with the positive pumping action of the present invention a residual pressure can be employed much lower than that it would be safe to use with conventional master cylinders as heretofore known.

The construction shown in Figure 2 is substantially similar to that of Figure 1 and parts therein which are identical with corresponding parts in Figure 1 have been indicated by the same reference numerals. In this construction, the reservoir 19 is connected to the cylinder substantially mid-way of its length by a compensating port 47 opening into the top of the cylinder and directly connecting the cylinder with the reservoir. The port is so placed that it will be exposed at the discharge end of the piston when the piston is in its fully retracted position, as shown. The operating lever 39 is connected to the piston rod 15 at a point below the axis of the cylinder to exert an applying force on the cylinder through an upwardly extending angle 48 so that there will be an upward component on the piston urging it against the compensating port 47. The closure plate 16 is further formed with a stop shoulder 49 which engages the piston rod of the piston or of a shoulder on the piston rod at the bottom so that the spring 25 will exert an upward component of force on the piston when it is retracted.

This construction operates in the same manner as that of Figure 1 except that the piston is urged upwardly by components of the applying and retracting forces so that it will be held tightly against the compensating port 47 to cover it without requiring extreme accuracy of manufacture or crossing of the port by a yielding packing.

While two embodiments of the invention have been shown and described in detail herein, it will be understood that these are illustrative only and are not intended as a definition of the scope of the invention, reference being had for this purpose to the appended claims.

What is claimed is:

1. A hydraulic pressure producing device comprising a cylinder, a piston slidable in the cylinder from a retracted position at one end of the cylinder to a discharge position at the other end of the cylinder, a piston rod on the piston extending through said one end of the cylinder, a liquid reservoir, the cylinder being formed in its side wall with a port communicating with the reservoir and which is covered by the piston except when it is in its fully retracted position, and an operating lever connected to the piston rod at a point lying on the side of the cylinder axis opposite the port whereby the force it exerts on the piston rod will urge the piston toward the port.

2. A hydraulic pressure producing device comprising a cylinder, a piston slidable in the cylinder from a retracted position at one end of the cylinder to a discharge position at the other end of the cylinder, a piston rod on the piston extending through said one end of the cylinder, a liquid reservoir, the cylinder being formed in its side wall with a port communicating with the reservoir and which is covered by the piston except when it is in its fully retracted position, a compression spring engaging the discharge end of the piston to urge it to its retracted position, and a stop positioned at one side only of the cylinder opposite port and engageable with the piston rod end of the piston only on the side thereof opposite the port.

3. A hydraulic pressure producing device comprising a cylinder, a piston slidable in the cylinder from a retracted position at one end of the cylinder to a discharge position at the other end of the cylinder, a piston rod on the piston extending through said one end of the cylinder, a liquid reservoir, the cylinder being formed in its side wall with a port communicating with the reservoir and which is covered by the piston except when it is in its fully retracted position, a compression spring engaging the discharge end of the piston to urge it to its retracted position, a stop engageable with the piston rod end of the piston on the side thereof opposite the port, and an operating lever connected to the piston rod at a point lying on the side of the cylinder axis opposite the port.

4. A hydraulic pressure producing device comprising a cylinder, a piston slidable in the cylinder from a retracted position at one end of the cylinder to a discharge position at the other end of the cylinder, a piston rod on the piston extending through said one end of the cylinder, a liquid reservoir, the cylinder being formed with a port communicating with the reservoir and which is covered by the piston except when it is in its fully retracted position, said port lying at the bottom of the cylinder and there being a groove in one of the cylinder and the piston to establish communication between the port and the discharge end of the cylinder at the top of the piston when the piston is retracted, and operating means connected to the piston rod to move the piston.

5. A hydraulic pressure producing device comprising a cylinder, a piston slidable in the cylinder from a retracted position at one end of the cylinder to a discharge position at the other end of the cylinder, a piston rod on the piston extending through said one end of the cylinder, a liquid reservoir, the cylinder being formed with a port communicating with the reservoir and which is covered by the piston except when it is in its fully retracted position, said port lying at the bottom of the cylinder and there being a groove in one of the cylinder and the piston to establish communication between the port and the discharge end of the cylinder at the top of the piston when the piston is retracted, and an operating lever connected to the piston rod at a point above the cylinder axis.

6. A hydraulic pressure producing device comprising a cylinder, a piston slidable in the cylinder from a retracted position at one end of the cylinder to a discharge position at the other end of the cylinder, a piston rod on the piston extending through the said one end of the cylinder, a liquid reservoir, the cylinder being formed in its side wall with a port communicating with the reservoir and which is covered by the piston except when it is in its fully retracted position, said port lying at the bottom of the cylinder and there being a groove in one of the cylinder and the piston to establish communication between the port and the discharge end of the cylinder at the top of the piston when the piston is retracted, a compression spring acting on the discharge end of the piston to urge it to its retracted position, a stop engaging the piston rod end of the piston at the top only to limit rearward movement thereof, and operating means connected to the piston rod at a point above the cylinder axis to move the piston.

7. A hydraulic pressure producing device comprising a cylinder, an elongated rigid piston slidable in the cylinder from a retracted position at one end of the cylinder to a discharge position at the other end of the cylinder, a piston rod on the piston extending through said one end of the cylinder, a liquid reservoir, the cylinder being formed with a port communicating with the reservoir and which is covered by the piston except when it is in its fully retracted position, flexible sealing means engaging the piston and the cylinder at a point remote from the discharge end of the piston and which is so located that it cannot move into register with the port, and means urging the piston laterally of the cylinder toward the port.

8. A hydraulic pressure producing device comprising a cylinder, an elongated rigid piston slidable in the cylinder from a retracted position at one end of the cylinder to a discharge position at the other end of the cylinder, a piston rod on the piston extending through said one end of the cylinder, a liquid reservoir, the cylinder being formed in its side wall with a port communicating with the reservoir and which is covered by the piston except when it is in its fully retracted position, flexible sealing means engaging the piston and the cylinder at a point remote from the discharge end of the piston and which is so located that it cannot move into register with the port, and an operating lever connected to the piston rod at a point lying on the side of the cylinder axis opposite the port.

9. A hydraulic pressure producing device comprising a cylinder, an elongated rigid piston slidable in the cylinder from a retracted position at one end of the cylinder to a discharge position at the other end of the cylinder, a piston rod on the piston extending through said one end of the cylinder, a liquid reservoir, the cylinder being formed in its side wall with a port communicating with the reservoir and which is covered by the piston except when it is in its fully retracted position, flexible sealing means engaging the piston and the cylinder at a point remote from the discharge end of the piston and which is so located that it cannot move into register with the port, a compression spring acting on the discharge end of the piston and urging it toward its retracted position, a stop engaging the piston rod end of the piston on the side of the cylinder axis opposite the port, and operating means connected to the piston rod at a point on the opposite side of the cylinder axis from the port to move the piston.

10. A hydraulic pressure producing device comprising a cylinder, a piston slidable in the cylinder and dividing it into a primary chamber at the discharge end of the piston and a secondary chamber at the other end of the piston, a liquid reservoir, the cylinder being formed with a port communicating with the reservoir and closed by the piston except when it is in its retracted position, means including a check valve opening to permit flow toward the cylinder connecting the reservoir with the secondary chamber, the piston having a passage therein connecting the primary and secondary chambers, a check valve in the passage opening toward the primary chamber, a piston rod of smaller diameter than the piston extending through the secondary chamber for moving the piston, and means urging the piston laterally of the cylinder toward the port.

11. A hydraulic pressure producing device comprising a cylinder, a piston slidable in the cylinder and dividing it into a primary chamber at the discharge end of the piston and a secondary chamber at the other end of the piston, a liquid reservoir, the cylinder being formed in its side wall with a port communicating with the reservoir and closed by the piston except when it is in its retracted position, means including a check valve opening toward the cylinder connecting the reservoir with the secondary chamber, the piston having a passage therein connecting the primary and secondary chambers, a check valve in the passage opening toward the primary chamber, a piston rod of smaller diameter than the piston extending through the secondary chamber for moving the piston, and operating means connected to the piston rod at the side of the cylinder axis opposite to the port to move the piston.

12. A hydraulic pressure producing device comprising a cylinder, a piston slidable in the cylinder and dividing it into a primary chamber at the discharge end of the piston and a secondary chamber at the other end of the piston, a liquid reservoir, the cylinder being formed in its side wall with a port communicating with the reservoir and closed by the piston except when it is in its retracted position, means including a check valve opening toward the cylinder connecting the reservoir with the secondary chamber, the piston having a passage therein connecting the primary and secondary chambers, a check valve in the passage opening toward the primary chamber, a piston rod of smaller diameter than the piston extending through the secondary chamber for moving the piston, a compression spring acting on the discharge end of the piston to urge it toward its retracted position, a stop engaging the piston rod end of the piston at the side opposite the port, and operating means connected to the piston rod at the side of the cylinder axis opposite to the port.

13. A hydraulic pressure producing device comprising a cylinder, a piston slidable in the cylinder and dividing it into a primary chamber at the discharge end of the piston and a secondary chamber at the other end of the piston, a liquid reservoir, communicating with the cylinder through a compensating port which is closed by the piston except when it is in its retracted position, means including a check valve opening toward the cylinder connecting the reservoir with the secondary chamber, the piston having a passage therein connecting the primary and secondary chambers, a check valve in the passage opening toward the primary chamber, a piston rod of smaller diameter than the piston extending through the secondary chamber for moving the piston, a valve disc at the outer end of the primary chamber seating outward of the primary chamber and movable into the primary chamber, a compression spring acting between the valve disc and the forward end of the piston so that the valve disc will only move into the chamber under a relatively high differential pressure, an outwardly opening check valve carried by the valve disc, and an inwardly opening check valve carried by the last-named valve to open under a relatively low differential pressure.

14. A hydraulic pressure producing device comprising a cylinder, a piston slidable in the cylinder and movable toward one end of the cylinder to force liquid therefrom, a valve disc at said end of the cylinder seating outward of the cylinder, a spring urging the valve disc on its seat so that it will unseat only in response to a relatively high differential pressure, an outwardly opening check valve carried by the valve disc, and an inwardly opening check valve carried by the last named valve to open in response to a relatively low differential pressure.

15. A hydraulic pressure producing device comprising a cylinder, a piston slidable in the cylinder and movable toward one end of the cylinder to force liquid therefrom, a valve disc at said end of the cylinder seating outward of the cylinder, a spring acting between the valve disc and the forward end of the piston so that the valve disc will unseat only in response to a relatively high differential pressure, an outwardly opening check valve carried by the valve disc, and an inwardly opening check valve carried by the last named valve to open in response to a relatively low differential pressure.

ADIEL Y. DODGE.

REFERENCES CITED

The following references are of record in the file of this patent:

UNITED STATES PATENTS

| Number | Name | Date |
|---|---|---|
| 1,707,063 | Loughead | Mar. 26, 1929 |
| 2,166,724 | Loweke | July 18, 1939 |
| 2,222,848 | La Brie | Nov. 26, 1940 |
| 2,282,333 | Masteller | May 12, 1942 |
| 2,349,416 | Freeman | May 23, 1944 |